United States Patent [19]

Okamura

[11] Patent Number: 4,590,495

[45] Date of Patent: May 20, 1986

[54] MULTI-COLOR INK JET PRINTER

[75] Inventor: Shigeru Okamura, Yokohama, Japan

[73] Assignee: Canon Kabushiki Kaisha, Tokyo, Japan

[21] Appl. No.: 767,701

[22] Filed: Aug. 22, 1985

Related U.S. Application Data

[63] Continuation of Ser. No. 476,254, Mar. 17, 1983, abandoned.

[30] Foreign Application Priority Data

Mar. 25, 1982 [JP] Japan .................................. 57-46293

[51] Int. Cl.⁴ ............................................. G01D 15/16

[52] U.S. Cl. ................................................ 346/140 R

[58] Field of Search .................................. 346/140, 75

[56] References Cited

U.S. PATENT DOCUMENTS

| | | | |
|---|---|---|---|
| 3,787,884 | 1/1974 | Demer | 346/140 X |
| 4,115,789 | 9/1978 | Fishbeck | 346/140 |
| 4,313,684 | 2/1982 | Tazaki | 346/140 X |
| 4,320,406 | 3/1982 | Heinzl | 346/140 |
| 4,342,041 | 7/1982 | Kasugayama | 346/140 |
| 4,394,669 | 7/1983 | Ozawa | 346/140 |

*Primary Examiner*—Joseph W. Hartary
*Attorney, Agent, or Firm*—Fitzpatrick, Cella, Harper & Scinto

[57] ABSTRACT

Disclosed is an ink jet printer wherein a flexible member associated with an ink ejection operation of an ink jet nozzle is arranged such that a driving load of a carriage which carries the ink jet nozzle is uniform at any point along a path of movement of the carriage.

4 Claims, 1 Drawing Figure

MULTI-COLOR INK JET PRINTER

This application is a continuation of application Ser. No. 476,254, filed Mar. 17, 1983, now abandoned.

BACKGROUND OF THE INVENTION

1. Field of the Invention

The present invention relates to an ink jet printer, and more particularly to an improvement to prevent a variation of velocity of movement of a carriage which carries print elements.

2. Description of the Prior Art

In an ink jet printer, a carriage which carries a plurality of ink jet nozzles is reciprocated on a print paper by a linear motor or a rotary motor to print characters. Ink contained in a stationary ink tank is supplied to the ink jet nozzles through a flexible ink tube to follow the reciprocation of the carriage. Although the ink tube is flexible, the rigidity and weight thereof are not negligible. In a multi-color ink jet printer, the number of ink tubes which form ink supply paths to supply inks of different colors increases and the rigidity increases accordingly. Since the rigidity of the ink tube changes as the carriage moves, a drive load of the carriage varies. This causes a variation in the velocity of the carriage movement. As a result, a flying locus of the ink drop ejected from the ink jet nozzle toward the print paper varies and a quality of record is degraded.

SUMMARY OF THE INVENTION

It is an object of the present invention to provide an ink jet printer in which an ink tube for supplying ink to ink jet nozzles mounted on a carriage is arranged such that a driving load of the carriage is uniform at every point within a range of carriage movement to prevent a variation of a velocity of the carriage movement.

BRIEF DESCRIPTION OF THE DRAWING

A drawing shows a perspective view of an embodiment of the present printer.

DETAILED DESCRIPTION OF THE PREFERRED EMBODIMENT

Figure 1:
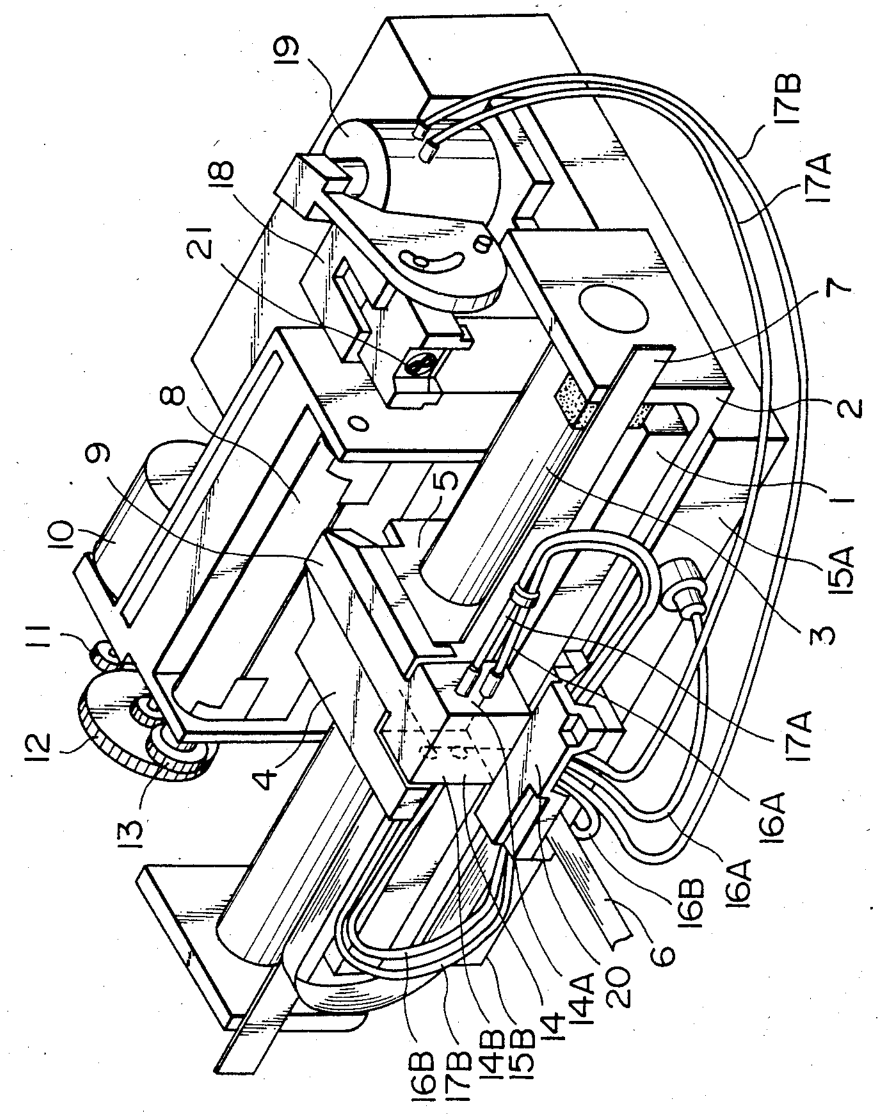

A drawing shows an embodiment of the present printer. Numeral 1 denotes a permanent magnet which is fixed on a yoke 2 having upwardly bent opposite ends. Another cylindrical yoke 3 lies between the upstanding opposite ends of the yoke 2 to form a closed magnetic circuit. A carriage 4 is movably mounted on the cylindrical yoke 3. The carriage 4 has a coil bobbin 5 on which a coil, not shown, is wound. The carriage 4 is movably fitted to the yoke 3 through the coil bobbin 5. Thus, the permanent magnet 1, the yokes 2 and 3 and the coil (not shown) form a linear motor. When the coil is energized, the carriage 4 reciprocates on the cylindrical yoke 3 in one direction or other depending on a polarity of a control current supplied to the coil. The coil is energized through a flexible cord 6. A position of the carriage 4 is detected by an optical slit plate 7 having a number of slits arranged thereon and a photocoupler (not shown) mounted on the carriage 4, and ink is ejected from an ink jet nozzle to be described later in accordance with a control signal representing the detected position of the carriage 4 so that characters are printed on a print paper fed along a platen 8. A nozzle holder 9 is mounted on the carriage 4 and the ink jet nozzle (not shown) is housed in the nozzle holder 9. The ink jet nozzle is formed by a fine glass tube, and a cylindrical piezoelectric element (not shown) is mounted around the ink jet nozzle. The control signal described above is applied to the piezoelectric element to physically deform it so that the ink is ejected by the deformation.

After one dot line of characters have been printed by the movement of the carriage 4 along the yoke 3, the carriage 4 is returned to a predetermined home position. In synchronism with the carriage return, the platen 8 is rotated by a predetermined angle to feed the paper. To this end, a pulse motor 10 is energized to rotate a gear 11 fixed to an output shaft thereof. The rotation is reduced by a gear 12 and then it is transmitted to a platen gear 13 which is in union with the platen 8. Thus, the platen 8 is rotated.

Numeral 14 denotes a sub-tank arranged behind the nozzle holder 9. It is sectioned into a red ink chamber 14A and a black ink chamber 14B. Numerals 15A and 15B denote ink cassettes which store red and black inks, respectively, and numerals 16A and 16B denote ink supply tubes for supplying the inks from the ink cassettes 15A and 15B to the sub-tanks 14A and 14B, respectively. Numerals 17A and 17B denote suction tubes which connect the sub-tank 14 to a pump 19 of a recovery system 18 which releases non-ejection of the ink of the ink jet nozzle. The tubes 16A, 16B, 17A and 17B are arranged at symmetrical positions on opposite sides 14A and 14B of the sub-tank 14, as shown. Numeral 20 denotes a pressing plate arranged at a center of the range of movement of the carriage 4. The respective tubes are fixed by the pressing plate 20 with each tube being sufficiently long to follow the movement of the carriage 4. The lengths of the portions of the tubes 16A and 16B which extend from the pressing plate 20 to the sub-tank 14 are equal, and the lengths of the tubes 17A and 17B are equal.

Thus, in accordance with the present invention, the ink tubes 16A, 16B, 17A and 17B are arranged in balance on the opposite sides of the carriage 4 such that the driving load of the carriage 4 does not vary, accordingly, a precision of the chopper constant velocity control of the carriage 4 by the optical slit plate 7 is enhanced.

The recovery system 18 is now described. In a print waiting condition, an end of the nozzle head in the nozzle holder 9 is positioned to a cap 21 of the recovery system 18 and the ink is sucked from the end of the nozzle head by the pump 9. In this manner, non-ejection of the ink or satelite due to the bearing of air from an orifice of the nozzle head or the deposition of dust at the end of the nozzle is released. Simultaneously with the suction from the cap 21, the inks in the sub-tank 14 are also sucked through the suction tubes 17A and 17B to keep the ink levels in the sub-tank 14 at levels of joints of the suction tubes 17A and 17B. Thus, sealed air layers above the ink levels in the sub-tank 14 which buffer the pressure variation during the print operation are kept constant. Further, even if the ink levels lower by the vaporization of the inks in the sub-tank 14 after long time non-use, the ink levels are kept at the predetermined levels by the suction through the suction tubes 17A and 17B.

As described hereinabove, according to the present invention, the flexible tubes which form ink paths are arranged in balance to the carriage which carries the ink jet nozzles, in the direction of the movement of the carriage so that the variation of the driving load of the carriage due to the rigidity and the weight of the tubes can be suppressed. Accordingly, the variation of the velocity of movement of the carriage is suppressed and the flying locus of the ink drop ejected from the ink jet nozzle is kept constant and the degradation of the record quality is prevented.

What is claimed is:

1. An ink jet printer comprising:

a movable carriage mounted for reciprocating movement;

sub-tank means including first and second sub-tanks mounted on said carriage and juxtaposed along the direction of movement thereof, each said sub-tank including a port facing along the direction of movement of said carriage in mutually opposing directions;

main tank means including first and second main tank chambers for storing first and second inks of different colors, respectively; and a pair of flexible supply tubes, each being connected between one of said ports and one of said main tank chambers for supplying ink of a particular color to each said sub-tank from a respective said main tank chamber, said flexible supply tubes thereby being evenly arranged at the opposite sides of said sub-tank means such that the driving load of said carriage is substantially uniform along the path of reciprocating movement of said carriage.

2. An ink jet printer according to claim 1, further comprising a plurality of ink jet nozzles mounted on said carriage, wherein said plurality of ink jet nozzles eject inks of different colors.

3. An ink jet printer according to claim 1, wherein said carriage is driven by a linear motor.

4. An ink jet printer according to claim 1, further comprising a plurality of flexible suction tubes for sucking excess air from said sub-tank chambers, said flexible suction tubes being evenly arranged at the opposite sides of said sub-tank means such that the driving load of said carriage is substantially uniform along a path of movement of said carriage.

* * * * *